May 26, 1964     R. G. ALLEN     3,134,299
PROJECTION SCREEN DEVICE WITH VERTICALLY
ADJUSTABLE DETACHABLE LEGS
Filed Sept. 15, 1961     2 Sheets-Sheet 1

INVENTOR.
RALPH G. ALLEN
BY
McMorrow, Berman & Davidson
ATTORNEYS

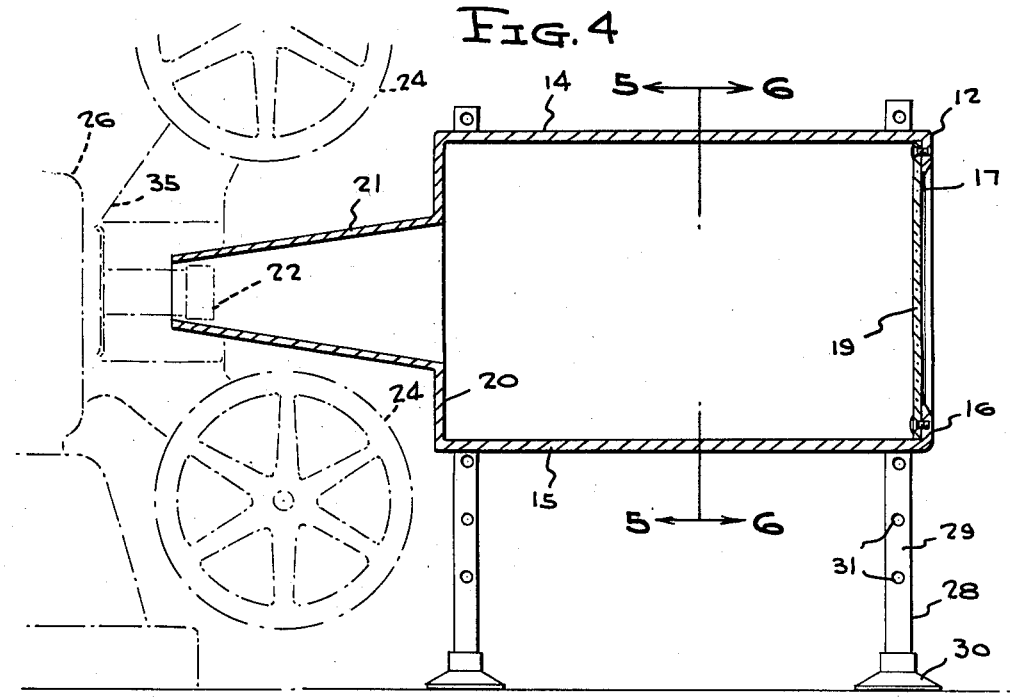
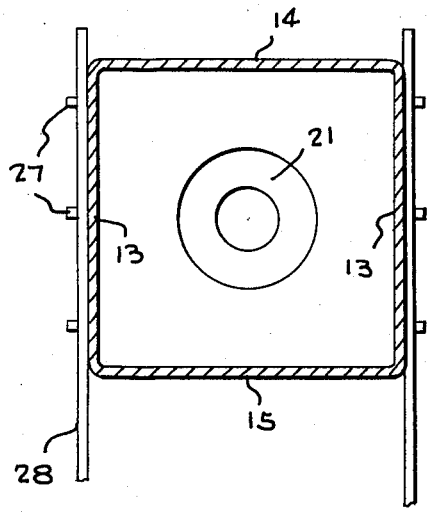
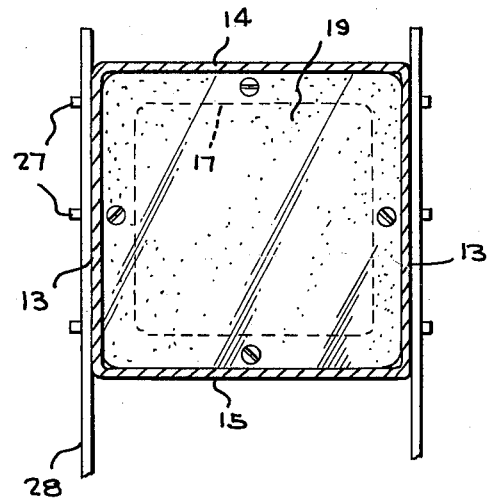

United States Patent Office 3,134,299
Patented May 26, 1964

3,134,299
PROJECTION SCREEN DEVICE WITH VERTICALLY ADJUSTABLE DETACHABLE LEGS
Ralph G. Allen, 28 Rockland St., Roxbury 19, Boston, Mass.
Filed Sept. 15, 1961, Ser. No. 138,439
2 Claims. (Cl. 88—24)

This invention relates to optical equipment, and more particularly to an apparatus for use in projecting motion pictures or other transparencies onto a screen so as to be clearly visible under daylight conditions or in the presence of artificial light.

A main object of the invention is to provide a novel and improved projection screen device which is relatively simple in construction, which is easy to set up for use, and which is arranged so that it resembles the general appearance of a television receiver, providing an image of approximately the same size as that provided on the screen of a television receiver and providing an image which is clearly visible under daylight conditions or in the presence of artificial light.

A further object of the invention is to provide an improved projection device for use with a motion picture projector, a slide projector, or similar optical equipment for picture projection, the device being relatively inexpensive to manufacture, being neat in appearance, being durable in construction, and being readily adjustable in accordance with the height of the projection lens of the apparatus with which it is to be employed.

A still further object of the invention is to provide an improved projection screen device which is relatively compact in size, which is adapted to efficiently utilize all of the light provided by a projection apparatus such as motion picture projector, a slide projector, or the like, and to provide an image which is clearly visible under daylight conditions or in the presence of relatively strong artificial light, the apparatus being readily adjustable in height and also being adjustable as to its inclination, so that it may be set up for use for convenient viewing under a wide range of variable conditions.

Further objects and advantages of the invention will become apparent from the following description and claims, and from the accompanying drawings, wherein:

FIGURE 4 is an enlarged longitudinal vertical cross sectional view taken through a projecting device substantially on the line 4—4 of FIGURE 1.

FIGURE 5 is a transverse vertical cross sectional view taken substantially on the line 5—5 of FIGURE 4.

FIGURE 6 is a transverse vertical cross sectional view taken substantially on the line 6—6 of FIGURE 4.

Figure 1:
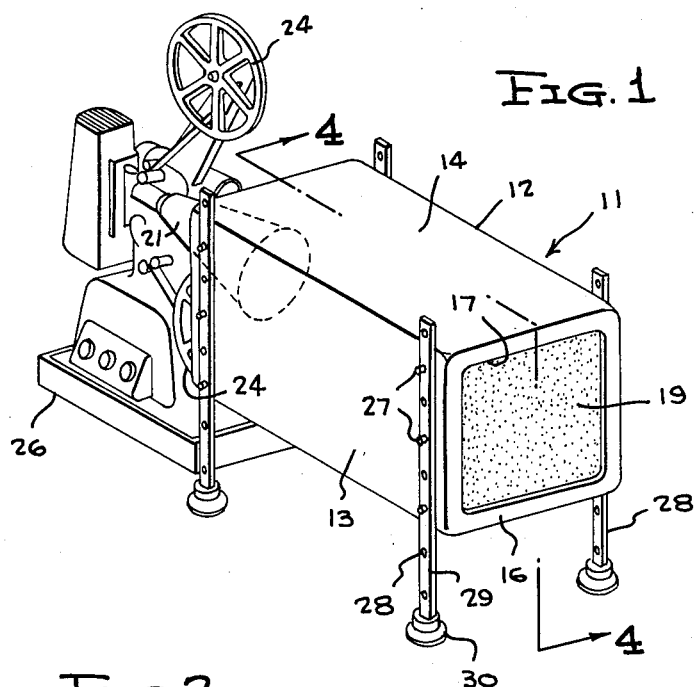
FIGURE 1 is a perspective view of an improved projection screen device according to the present invention in operating position and arranged for use in conjunction with a motion picture projector.

Referring to the drawings, 11 generally designates a projection screen device constructed in accordance with the present invention. The projection screen device 11 comprises an elongated housing 12 which may be of square or rectangular transverse cross section, the housing being made of opaque material, such as opaque plastic material, or the like, and having vertical side walls 13, 13 and horizontal top and bottom walls 14 and 15.

The front end wall of the housing 12, shown at 16, is formed with a generally rectangular window 17 which includes the major portion of the area of the front wall 16, and secured to the inside margin of the opening 17 is a panel of translucent material 19, which may be of translucent glass, translucent plastic material, or the like.

The rear end wall 20 of the housing 12 is centrally formed with a rearwardly tapering, generally frusto-conical light transmission conduit 21, the conduit 21 being integrally formed with the rear wall 20 and being therefore of the same opaque material as said rear wall. The end of the conduit 21 is dimensioned so as to receive a conventional projection lens assembly 22 therein, as shown in dotted view in FIGURE 4, whereby the projection lens will extend a substantial distance into the light transmission conduit 21, minimizing the escape of stray light from the lens assembly. As shown in FIGURE 4, the frusto-conical light transmission conduit is of substantial length so that it will extend between the film-carrying reels 24 and 25 of a conventional projector 26 and will therefore be of sufficient length to receive a substantial portion of the projection lens assembly 22.

Figure 3:
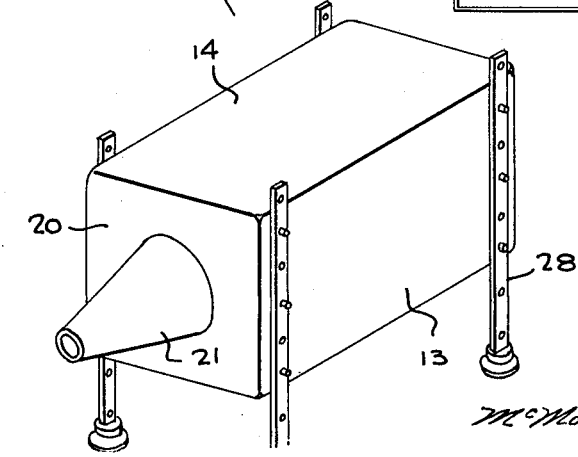
FIGURE 3 is a fragmentary rear perspective view of the projection screen device employed in FIGURE 1.

A plurality of vertically spaced, outwardly projecting, vertically aligned pegs 27 are provided on each end portion of each of the opposite side walls 13, 13 of the housing 12, the pegs being spaced apart by the same distances. Respective supporting legs 28 are provided at each of the corner portions of the housing 12, each of the legs comprising an upstanding bar member 29 to the bottom end of which is secured a foot portion 30. Each of the bar members 29 is provided with a series of uniformly spaced apertures 31, the spacing between alternate apertures 31 being the same as the vertical spacing between the pegs 27, the apertures 31 being dimensioned to snugly receive the pegs 27 in the manner illustrated in FIGURES 1 and 3 so as to connect the legs 28 to the corners of the housing 12, whereby to vertically support the housing. As will be readily apparent, the elevation of the housing may be easily adjusted by suitably selecting the apertures 31 to be engaged with the pegs 27, and furthermore, the housing may be supported at a desired angle with respect to the horizontal by employing the corresponding apertures 31 in the forward legs 28 required to cause the housing to assume the desired angular position.

Figure 2:
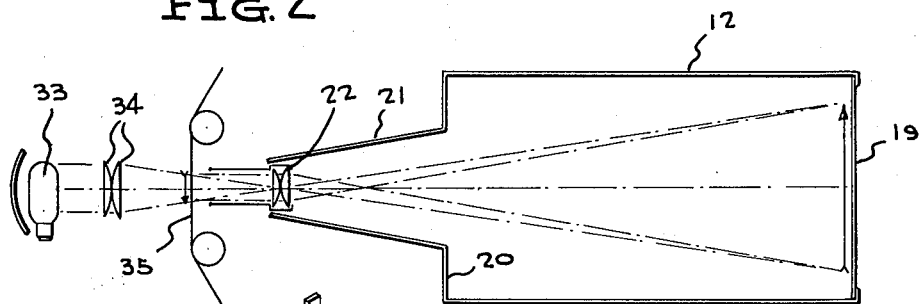
FIGURE 2 is a diagrammatic horizontal cross sectional view showing the optical system of the arrangement of FIGURE 1.

With the projection lens assembly 22 extending into the end of the frusto-conical light transmission conduit 21 in the manner illustrated in FIGURES 2 and 4, the light rays from the projection lamp 33 of the motion picture projector, slide projector, or similar projection apparatus, passes through the condensing lenses 34 and through the film 35 into the projection lens assembly 22, being transmitted through the projection lens assembly by way of the opaque conduit 21 and the housing 12 to the translucent viewing screen 19. By means of the conventional focussing mechanism of the projection device, the lens assembly 22 is adjusted to focus the projected image onto the translucent screen 19, so that the resultant image is clearly visible from the front end of the device 11 and can be viewed on the translucent screen 19 in the same manner as in the case of a television receiver.

Since the light rays are focused onto the screen 19 at relatively short range, the resultant image is of high intensity, so that the image is clearly visible under daylight conditions or under conditions of relatively strong external artificial light. Thus, the use of the device 11 with a motion picture projector, or similar light projection apparatus, enables motion picture film, slides, or the like, to be viewed under normal room conditions without requiring the room to be darkened. The projected material can be viewed with as great or better visibility than that which is obtainable in the case of a conventional television receiver.

When the apparatus is not in use, the legs 29 may be quickly detached therefrom so that the housing 12 and said legs may be conveniently stored for subsequent further use. To set up the apparatus for use, it is merely necessary to engage the legs 29 on the pegs 27, as above described, with the housing supported at the height required for the projection lens assembly 22 to be received in the end of the light transmission conduit 21.

While a specific embodiment of an improved projection screen device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A projection screen device comprising an elongated housing of opaque material, a translucent projection screen forming a portion of one end wall of said housing, an elongated light transmission conduit connected to the opposite end wall of said housing and being adapted to receive the projection lens assembly of a picture projection apparatus, a plurality of vertically spaced outwardly projecting vertically aligned pegs secured to each end portion of each of the opposite sides of the housing, and respective apertured vertical supporting legs adjacent said end portions, each of said legs having a series of uniformly spaced apertures located so that a selected group of apertures can be simultaneously engaged on the set of vertically aligned pegs at each of said end portions.

2. A projection screen device comprising an elongated housing of opaque material, said housing having vertical side walls and horizontal top and bottom walls, a translucent projection screen secured in and forming the major portion of one end wall of said housing, a generally frustoconical, elongated forwardly flaring light transmission conduit connected to the opposite end wall of said housing and being adapted to receive the projection lens assembly of a picture projection apparatus, a plurality of vertically spaced outwardly projecting vertically aligned pegs secured to each end portion of each of the opposite side walls of the housing, and respective vertical supporting legs adjacent said end portions, each of said legs having a series of uniformly spaced apertures located so that a selected group of apertures can be simultaneously detachably engaged on the sets of vertically aligned pegs at each of said end portions.

References Cited in the file of this patent

UNITED STATES PATENTS

| 766,684 | Frink | Aug. 2, 1904 |
| 2,017,292 | Porter | Oct. 15, 1935 |

FOREIGN PATENTS

| 564,040 | France | Oct. 11, 1923 |